Figure 1:
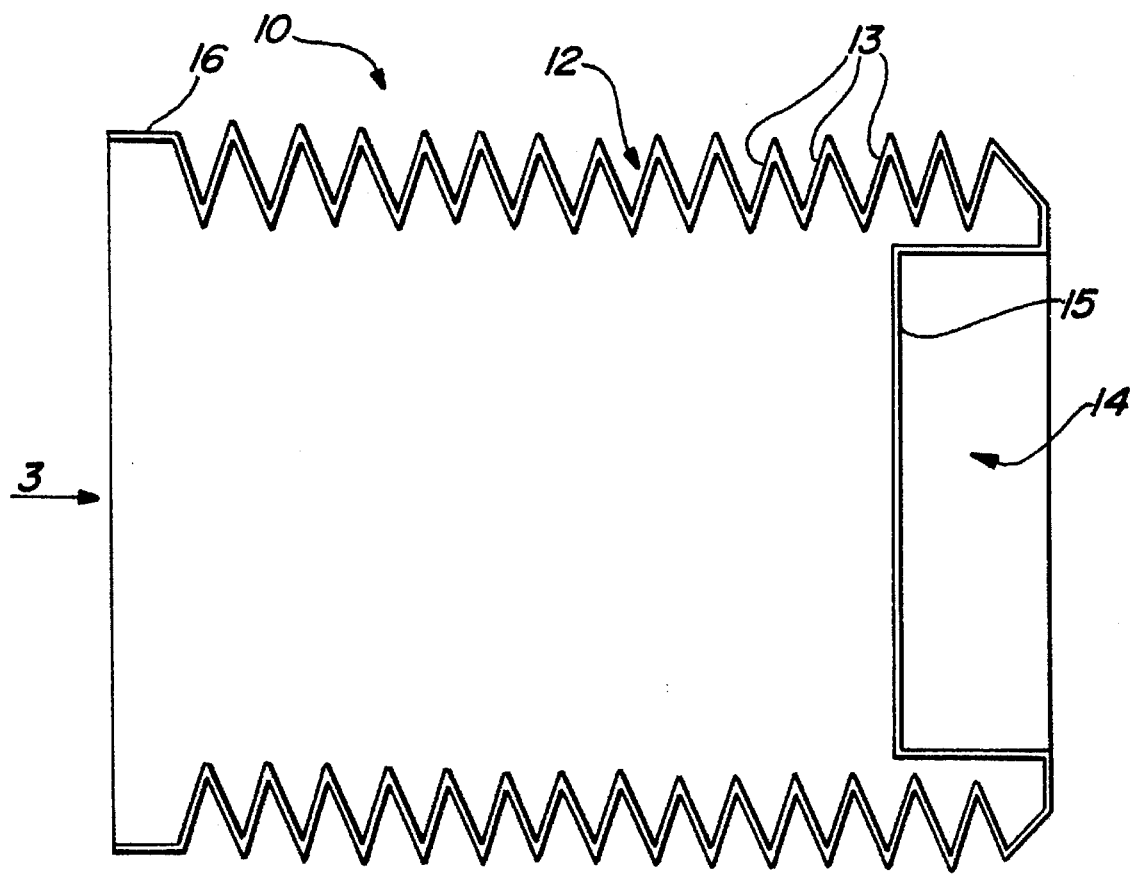

United States Patent [19]
McGill

[11] Patent Number: 5,632,415
[45] Date of Patent: May 27, 1997

[54] DISPENSING MACHINE FOR DISPENSING SEMI-SOLID FOOD PRODUCTS

[75] Inventor: Gary S. McGill, Rochester, England

[73] Assignee: Unice International Limited, Coventry, England

[21] Appl. No.: 411,604

[22] PCT Filed: Dec. 23, 1993

[86] PCT No.: PCT/GB93/02651

§ 371 Date: Apr. 10, 1995

§ 102(e) Date: Apr. 10, 1995

[87] PCT Pub. No.: WO94/14333

PCT Pub. Date: Jul. 7, 1994

[30] Foreign Application Priority Data

Dec. 29, 1992 [GB] United Kingdom ............... 9227028

[51] Int. Cl.⁶ .................................. B65D 35/30
[52] U.S. Cl. ................... 222/95; 222/135; 222/146.6; 222/145.5
[58] Field of Search ................... 222/92, 95, 135, 222/146.6, 145.1, 145.5, 145.6, 145.7, 145.8, 212, 215

[56] References Cited

U.S. PATENT DOCUMENTS

| | | | |
|---|---|---|---|
| 3,330,129 | 7/1967 | Halverson et al. | 222/145.7 |
| 4,420,948 | 12/1983 | Savage | 62/340 |
| 5,069,364 | 12/1991 | McGill | 222/95 |
| 5,150,820 | 9/1992 | McGill | 222/146.6 X |
| 5,265,764 | 11/1993 | Rowe et al. | 222/95 |
| 5,333,761 | 8/1994 | Davis et al. | 222/212 |
| 5,361,941 | 11/1994 | Parekh et al. | 222/95 |
| 5,463,878 | 11/1995 | Parekh et al. | 222/95 X |

FOREIGN PATENT DOCUMENTS

| | | | |
|---|---|---|---|
| 0314209 | 5/1989 | European Pat. Off. | |
| 2230057 | 10/1990 | United Kingdom | 222/95 |
| 2234556 | 2/1991 | United Kingdom | |

Primary Examiner—Andres Kashnikow
Assistant Examiner—Kenneth Bomberg
Attorney, Agent, or Firm—Gifford, Krass, Groh, Sprinkle, Patmore, Anderson & Citkowski, P.C.

[57] ABSTRACT

A dispensing machine is particularly intended for dispensing semi-solid products such as ice cream or frozen yogurt. The machine utilizes a container for the product which container is open at one end and is deformed to discharge the product by the application of a plunger to the opposite end. A sealing plate is releasably located in the open end of the container and the plate includes a discharge outlet for the product which leads to a discharge nozzle. The plunger is driven by a piston and cylinder device and the container, the plate and its housing is movable in and out to replace the container.

22 Claims, 3 Drawing Sheets

DISPENSING MACHINE FOR DISPENSING SEMI-SOLID FOOD PRODUCTS

This invention relates to dispensing machines and in particular, but not exclusively, to dispensing machines for dispensing food products of solid, semi-solid or viscous form.

It has been proposed to dispense product from deformable containers in which the product has been packed, the product discharging from an outlet at one end of the container when engaged by drive means at the opposite end of the container.

An object of the invention is to provide an improved dispensing machine and container therefor.

According to one aspect of the invention a dispensing machine comprises a deformable container open at one end and arranged to be engaged by a plunger at the opposite end, the container deforming upon engagement by the plunger to reduce its internal volume, sealing means releasably sealable with the open end of the container and having at least one outlet for discharging product from within the container, a housing for the container, drive means for moving the plunger towards the outlet, and a discharge nozzle communicating with the outlet.

In one arrangement the side walls of the container between the ends are deformable during operation of the plunger and the open end of the container is engageable with the sealing means which is in the form of a sealing plate, releasable securing means being engageable with said container end to seal said end against the sealing means.

Conveniently the releasable securing means is in the form of a band or ring located around the open end of the container and engageable against the sealing plate.

The container may be generally cylindrical and the open end has a size approximating to the diameter of the cylinder and the generally cylindrical side walls of the container may be of corrugated form to permit deformation of the side walls in the longitudinal direction of the container.

Preferably the housing encloses the container in use and the container is located generally horizontally within the housing. Conveniently the housing is formed with an upper and a lower part and the housing is located within an insulated chamber.

The lower part of the housing and the sealing plate may be movably mounted to move the container to a position in which the container may be released from the sealing plate and the housing. Conveniently the machine comprises drawer means on which the housing and container are supported.

The drive means may comprise a piston and cylinder device operable to engage the plunger with the container at its end remote from the outlet, the piston and cylinder device comprising a multi cylinder arrangement in which the stroke of the piston is greater than the closed length of the cylinder.

The machine may comprise two or more of said deformable containers each associated with sealing means and drive means, and the containers communicating with a common discharge nozzle whereby product from each container may be discharged through said nozzle. In this arrangement the nozzle may be formed by nozzle means communicating with each container and having valve means wherein product from either container or both containers is dischargeable through the common nozzle.

Conveniently the drive means is located displaced to the side of the axis of the or each container and with its axis of movement parallel to said container axis, the plunger being connected to the drive means by a linkage.

The sealing means may carry removable gasket means which is interposed between the sealing means and the product to prevent contact between the product and the sealing means.

According to another aspect of the invention a dispensing machine comprises at least one deformable container for product, a plunger arranged to engage one end of the container and the container having an opening at the other end for discharge of the product from the container upon operation of the plunger, sealing means for the opening, a housing part for the container whereby the container is releasably mounted in the machine, the housing part being attached to the sealing means, and a machine frame supporting the housing part in a generally horizontal position so that the housing part is movable relative to the frame, the housing part being movable between operative and inoperative positions supporting the container and the container being releasable from the housing part and the sealing means when in the inoperative position. Preferably the housing part is slidably mounted in the frame to be movable generally horizontally between said positions to expose the container for release when in said inoperative position.

According to a further aspect of the invention a container for the dispensing machine of the invention comprises a container body which is deformable in its lengthwise direction, an end wall at one end of the body, an open end at the other end of the body, the open end being of substantially the same cross-sectional dimensions as the cross-sectional dimensions of the body, the end wall being arranged to be engaged by a plunger and the open end being arranged in use to receive sealing and abutment means with an outlet opening whereby when the plunger engages said end wall the body deforms in its lengthwise direction to reduce the internal volume of the container, and product within the container is discharged through said outlet. Conveniently the open end of the container is formed with an outer surface engageable by securing means to seal said end against said sealing and abutment means.

Figure 3:
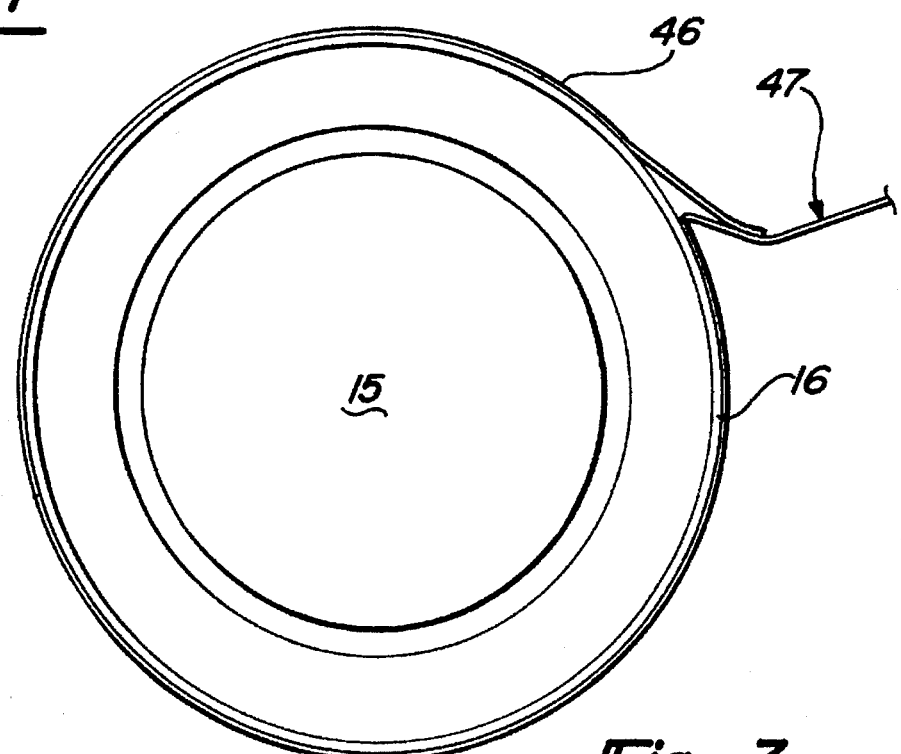
Figure 2:
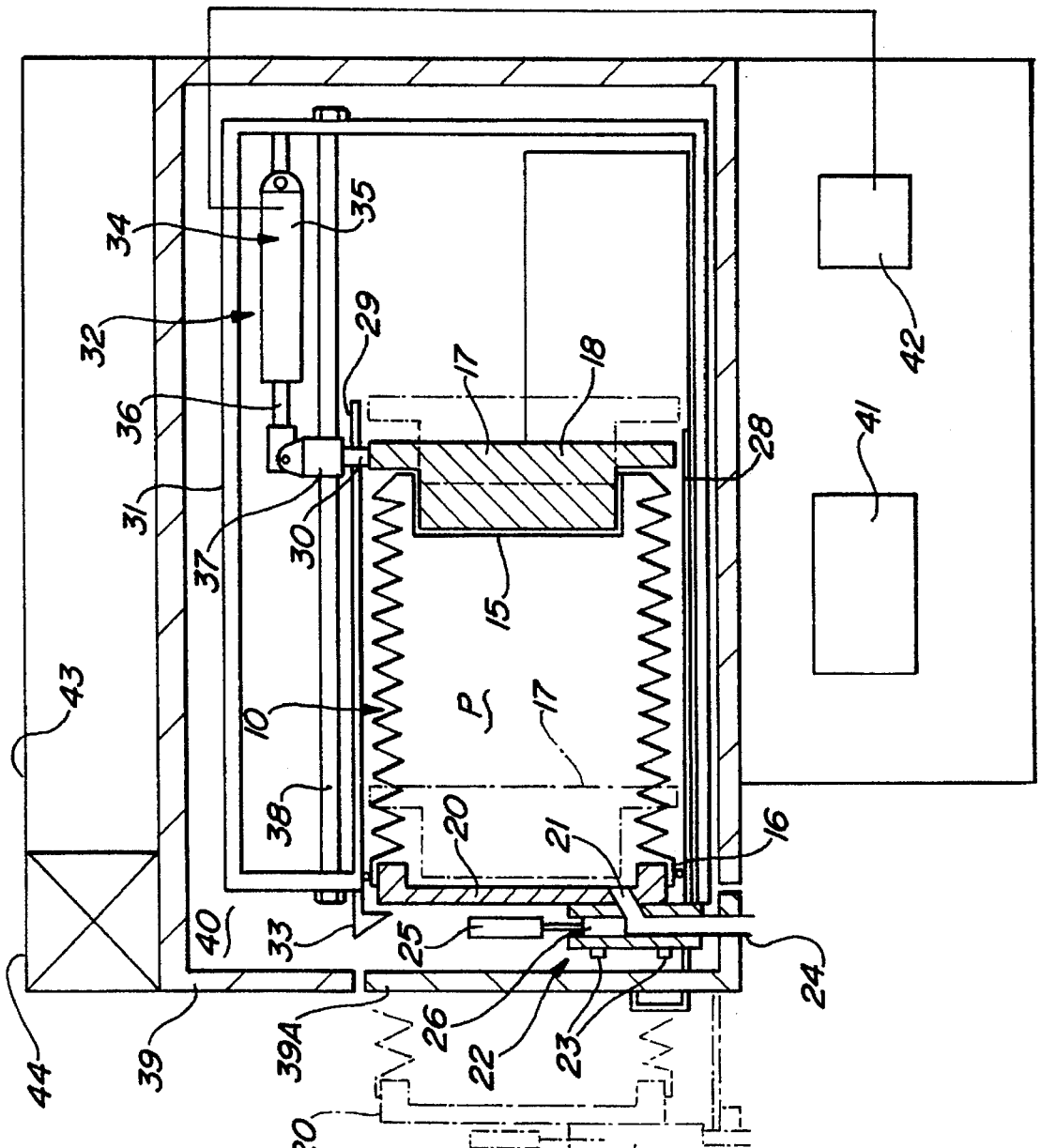
Figure 2A:
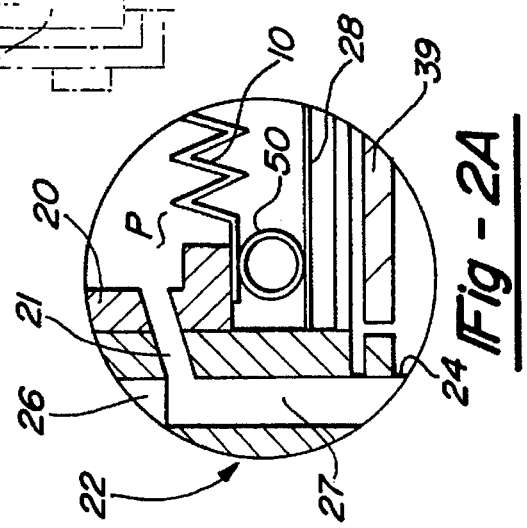
Figure 4:
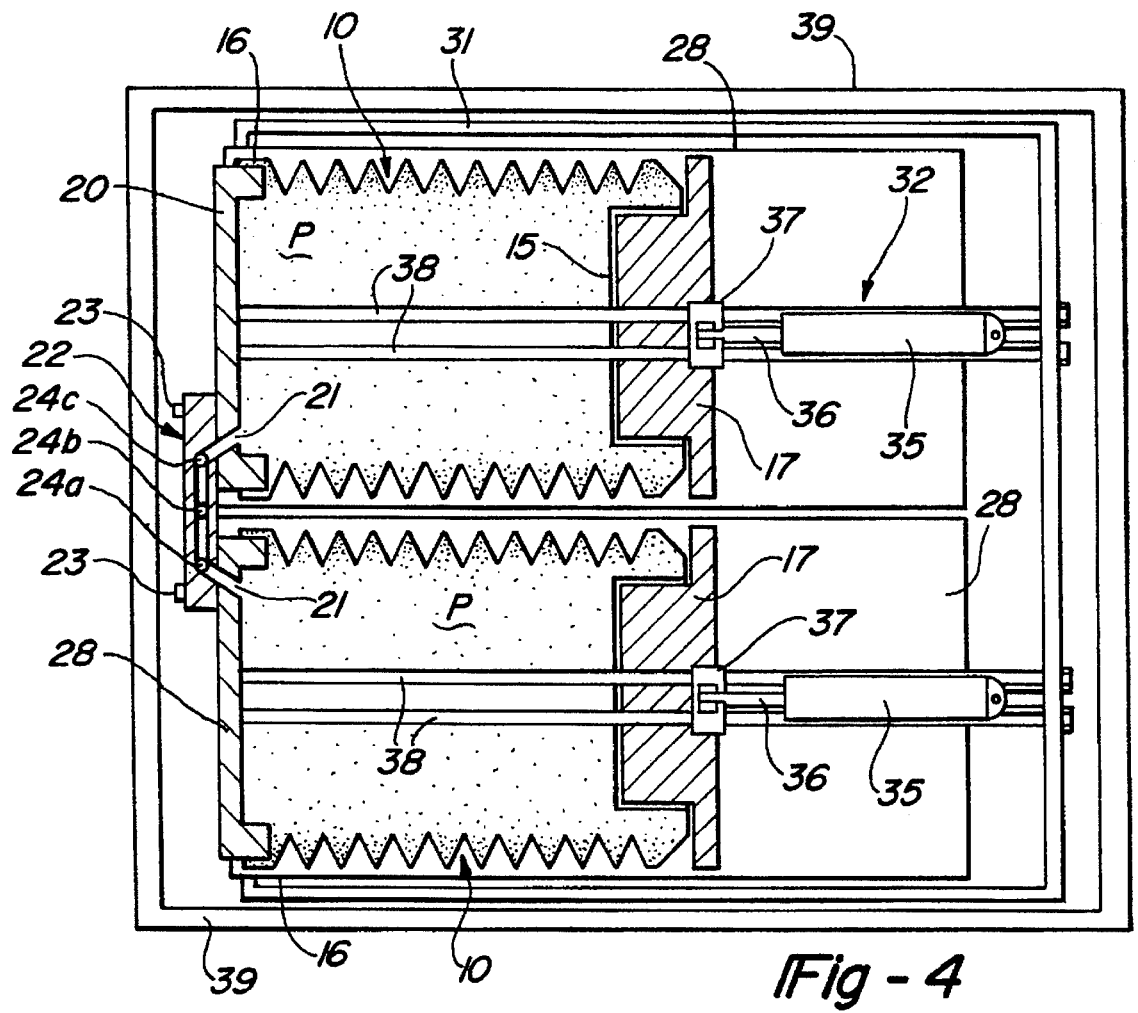
Figure 4A:
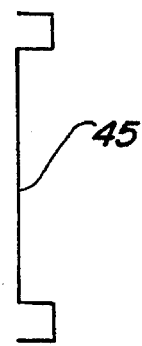

Further features of the invention will appear from the following description of an embodiment of the invention given by way of example only and with reference to the drawings, in which:

FIG. 1 is a section through a container for the dispensing machine,

FIG. 2 is a vertical section through a dispensing machine in which the container of FIG. 1 is employed, FIG. 2A is an enlarged view of part of the machine of FIG. 2, FIG. 3 is an end view of the container of FIG. 1 in the direction of arrow 3 showing a clamp arrangement, FIG. 4 is a plan view of the machine of FIG. 2, partly in section, and FIG. 4A is a section through a gasket for use in the machine of the invention.

Referring to the drawings and firstly to FIG. 1 there is shown a container 10 for use with the dispensing machine. The container 10 is generally cylindrical having a side wall 12 formed with corrugations 13. At one end of the container 10 is an end wall 14 over the central region of which is formed a depression 15 shaped to receive a plunger (to be described) or the depression 15 may be formed by engagement of the plunger with the end wall 14.

At the opposite end of the container 10 to the end wall 14 the container is open and has a short cylindrical portion 16 forming a continuation of the side wall 12 and having a diameter substantially the same as the outermost diameter of the corrugations 13. Alternatively the cylindrical portion 16 has the diameter of the innermost size of the corrugations 13 or may be of a size intermediate the inner and outer diameters of the corrugations.

Although the container is shown and described as cylindrical it may be of other shapes. For example the container may be of rectangular cross section over most of its length, a smaller dimension being vertical and the larger horizontal. At one end, the open end of the container, a cylindrical portion may be formed for location with a sealing plate, to be described. Alternatively the container may be of rectangular section at the open end, with the corners radiused at the open end and along the sides of the container.

It will be seen that the container 10 is capable of being shortened in its axial direction by deformation of the corrugations 13 in the manner of a bellows or concertina. Thus if the end portion 16 of the container is held and pressure is applied on the end wall 14 the container 10 will shorten and its internal volume will be reduced.

Referring now to FIGS. 2–4, the container 10 of FIG. 1 is shown in use in a dispensing machine. In this case the dispensing machine is arranged to receive two containers 10 but the machine can be arranged to dispense product from only one container or several containers and the container or containers may be vertical. In the illustrated arrangement the containers 10 and their associated parts duplicate one another.

The containers 10 are each located in the machine with a plunger 17 at one end, the plunger having a projecting portion 18 which is received in the depression 15 and the plunger over its remaining part having an external diameter approximating to or exceeding the maximum external diameter of the container 10. As shown the head of the plunger is flat but it may be convex or domed outwardly towards the container.

At the opposite end of each container 10 is located a sealing plate 20, the sealing plate having an external diameter slightly less than the internal diameter of the cylindrical portion 16 at one end of the container 10 whereby the sealing plate 20 is locatable within the cylindrical portion 16. As will be described, in use, the sealing plate 20 is clamped to the container by clamping means. The sealing plate 20 may be concavely shaped on its inner surface to correspond to the shape of the plunger 17. When the container is generally rectangular with a rectangular open end the sealing plate is correspondingly shaped.

The sealing plate 20 is formed with an outlet opening 21 which is located to one side of the plate 20 over a central region of the plate. The outlet opening 21 of each plate 20 leads to a valve block 22 which is releasably mounted on each of the adjacent sealing plates 20 by means of locating members 23 which are easily released to remove the block 22 when cleaning is required. Alternatively a separate valve block is provided for each container and the outlet may be located centrally of the container. Moreover two or more outlets may be provided in the sealing plate each having a control valve to control discharge.

The valve block includes conduits communicating with the outlet openings 21 to a selection of three discharge nozzles 24A, 24B and 24C. Of the discharge nozzles 24 a central nozzle 24B communicates with the outlet openings 21 of both containers. The other two discharge nozzles 24A and 24C communicate with the adjacent containers and the central nozzle 24B. Each of the discharge nozzles is associated with a discharge valve 25 and each valve 25 has a valve member 26 capable of being moved between a closed position, a diverting position or an open position in which the nozzle 24A or 24C associated with the valve 25 is closed to the interior of the container 10, admits product from the container outlet 21 to discharge through the associated nozzle 24, or diverts product to the central nozzle 24B. Each valve 25 includes a piston and cylinder 27 arranged to move the valve member 26 between the open and closed positions. Each piston and cylinder 27 is independently operable and it will be seen that with the valve member 26 of the central nozzle 24B closed, product may be discharged from either one or both of the two containers through the associated nozzle 24A or 24C. Alternatively with the valves 25 in positions to divert product from the containers 10 and the central valve 25 open, product from each container can be discharged from a common central nozzle 24B. Alternatively individual nozzles for each container and an associated discharge valve 25 may be provided.

The containers 10 are each located in housings which comprise a lower semi-cylindrical base member 28 located horizontally and an upper semi-cylindrical member 29 mounted over the respective container 20. The member 29 is divided along its median line to receive a drive 30 to the plunger 17.

The machine also includes a framework 31 securing drive means 32 for the containers and a locking mechanism 33 for retaining the sealing plates 20 in position. The framework 31 also provides a support for the semi-cylindrical base 28 which is slidably removable from the machine in a horizontal direction, as will be described, relative to the framework 31.

The framework carries a hydraulic piston and cylinder device 34 of the drive means 32, a cylinder 35 of the device 34 being fixedly attached to the framework 31 and a piston rod 36 being attached to a slide 37 which is slidably movable along guide rods 38. The slide 37 is secured through a connection 30 to a plunger 17 for each container. The guide rods 38 are attached at opposite ends to the framework 31. Further guide rods (not shown) may be provided to support the plunger 17 at the lower end of the plunger.

It will be seen that upon extension of the piston and cylinder device 34 the plunger 17 will move in a discharge direction towards the sealing plate 20, thereby deforming the container 10 and reducing its internal volume. Upon completion of a discharge stroke of the plunger 17 the piston and cylinder device 34 is retracted to return the plunger 17 to its initial position. The emptied container 10 can then be removed, as will be described.

It is preferred to use a hydraulically operated piston and cylinder device 34 which has double or triple acting pistons whereby a relatively short overall length can accommodate a relatively long stroke of the piston rod 36. Moreover the use of a hydraulically operated device will enable accurate movement of the piston in the cylinder and the extension of the piston and cylinder can be monitored and the pressure in the cylinder can be adjusted and controlled. For example the pressure may be increased and decreased according to the position of the plunger 17 along its path of travel or according to the product within the container 10. Moreover the pressure applied by one plunger may be different to the pressure applied by the other plunger.

The device 34 may have positional detection means (not shown) whereby the position of the plunger 17 is known and the pressure applied to the device may be determined according to the position of the plunger giving, for example, the opportunity to increase or decrease the pressure to give the same discharge rate of product over the full stroke of the plunger. Pressure may be changed by increasing or decreasing the rate at which the pump powering the device 34 is operated in accordance with signals received from the positional detection means.

Similarly the pressure at the plunger 17 may be changed according to the nature of the product in the or each container 10 so that different products in each container 10 may have the same or different discharge rates. In this case flow rate detection means (not shown) may be provided to detect the rate of flow of product from the or each container and the pressure may be adjusted according to the rate of flow or a predetermined rate of flow of product.

Alternatively or in addition the pressure at the plunger 17 may be adjustable by the operator according to information received by the operator.

In one arrangement pressure relief is provided on the container when dispensing is not taking place. Thus, for example, when a predetermined time elapses after a dispensing operation, pressure at the plunger is reduced to a low level or to zero. Alternatively or in addition the plunger may be withdrawn a short distance from the container to release pressure on the container. The hydraulic piston and cylinder can be replaced by other drive means for the plunger such as pneumatic means or an electrically driven motor.

Each container 10, its associated semi-cylindrical base 28, its associated sealing plate 20 and the valve block 22 are all slidably arranged with respect to the framework 31 to enable the container to be moved slidably in a generally horizontal direction, as shown by chain lines in FIG. 2, to enable containers to be exchanged when necessary. For this purpose the semi-cylindrical base 28 is slidably supported on the framework 31 in the manner of a drawer.

The machine has an insulated outer casing 39 defining a closed chamber 40 which may be kept at the desired temperature for the product within the containers 10. Generally it is required that the product be kept at a predetermined low temperature so the machine will incorporate refrigeration means 41. Part of the outer casing 39A is associated with the respective container 10 so that it is movable, when the container needs to be renewed, with the container 10 the base 28 of the housing and associated parts.

The machine also accommodates a source of hydraulic power 42 for the piston and cylinder device 34. If required the upper end of the machine carries a display arrangement 43 including a light box 44 on which the name of the product to be dispensed is illuminated.

It will be appreciated that during dispensing the rear face of the sealing plate 20 will normally be contacted with the product P within the container 10. Provided the containers fitted in the machine contain the same product in each replacement container this will not normally affect the product quality. However, if desired, a removable gasket 45, see FIG. 4A, can be applied to the face of the plate 20 and the gasket may be renewed when a fresh container is located in the machine or the gasket may be sanitised and replaced.

In locating containers 10 in the machine the cylindrical locating portion 16 of each container is a close fit around the outer edge of the sealing plate 20 and to ensure that the container is sealed clamping means located around the outside of the portion 16 is provided. Such clamping means may take the form shown in FIG. 3 comprising a band 46 which locates around the portion 16 and includes a locking mechanism 47 which tightens the band around the container. Alternatively other clamping means may be employed such as hydraulically operated clamps (not shown) which engage around the outer surface of the portion 16. As a further alternative an inflatable tubular ring 50 may be provided extending around the portion 16 and being inflated by air or by hydraulic fluid to engage and clamp the portion against the sealing plate 20 (see FIG. 2A).

The container 10 may contain any suitable food product which is of a solid, semi-solid or viscous constituency such as ice cream, frozen yoghurt or other chilled or frozen confectionery. The container 10 is filled through its open end in a food processing facility and a suitable cover (not shown) is located over the open end of the container. The container may be cooled to low temperatures for storage and transport and when it reaches the point of consumption it may be tempered to the required dispensing temperature in, for example, a tempering cabinet.

When the full container 10 is required to be dispensed it is removed from storage and located in the machine housing after removal of its cover. This action is achieved by withdrawing the semi cylindrical base 28 with its associated parts on the slide arrangement thereby exposing the base 28 to the user, the plunger 17 being located in its fully retracted position. The container 10 is mounted on the base 28 with the locating portion 16 fitting over the sealing plate 20. The band 46 and locking mechanism 47 or other clamping system is operated to secure the container to the sealing plate 20 and the base 28 and associated parts are slid back into the operating position in the machine. In the operating position the movable parts are secured as by the locking catches 33 which are secured to the framework 31.

The container 10 is then ready for a dispensing operation and the piston and cylinder device 34 is operated to extend the plunger 17 and engage the plunger in the depression 15 in the container 10. The valve or valves 25 are operated to enable product to be discharged from the appropriate discharge nozzle 24 while the plunger deforms the side wall of the container and causes product P to be discharged through the outlet opening 21. Discharge of product can be carefully controlled by operation of the piston and cylinder device 34. Product is discharged from the relevant discharge nozzle 24 into a receptacle (not shown) which may be of any convenient form for receiving the product.

During dispensing the chamber 40 within the outer casing 39 is kept at the desired dispensing temperature and there may be provided within the chamber 40 fans for circulating cold air and ensuring quick stabilisation of the chamber temperature.

The valve block 22 is readily removable from the machine for cleaning purposes and access to the valve block is obtained through a hinged opening (not shown) in the part 39A of the casing.

The invention provides a dispensing system utilising a container which is readily filled with product, which has the facility for multi flavour product dispensing, which is relatively simple and compact and is easily operated without significant hygiene problems.

I claim:

1. A dispensing machine for dispensing product from a container of product, comprising a deformable container for product, the container having one end and an opposite end, a plunger engageable with said one end to deform the container, said opposite end having an opening through which product is discharged, movement of the plunger when engaged with said one end causing the container to deform and reduce the internal volume of the container whereby product is extruded from said opening, shut-off valve means controlling discharge of product from the container, an insulated frame, a housing for supporting the container movably in said frame, said housing having a seating for the container, slide means whereby said housing is slidably mounted on said frame for generally horizontal movement relative to the frame between operative and inoperative positions, said housing extending outwards from the frame when in the inoperative position for removal of said container from said housing and, in the operative position of said housing, said container and said valve means being located within said insulated frame, latch means for releasably latching said housing in the operative position in said frame, discharge of product from said container taking place when said housing is in the operative position, and refrigeration means for providing a cold environment within the insulated frame.

2. The machine of claim 1 wherein the container has side walls between the ends which are deformable during operation of the plunger.

3. The machine of claim 1 wherein the container has generally cylindrical side walls and the open end has a size approximating to a diameter of the cylinder.

4. The machine of claim 3 wherein the generally cylindrical side walls of the container are of corrugated form to permit deformation of the side walls in the longitudinal direction of the container.

5. The machine of claim 1 wherein the housing encloses the container in use and a longitudinal axis of the container is located generally horizontally.

6. The machine of claim 1 wherein the housing is formed with an upper part and a lower part constituting said seating the container being seated in use in said seating.

7. The machine of claim 1 wherein a drive means for said plunger comprises a piston and cylinder device operable to engage the plunger with the container.

8. The machine of claim 1 wherein a pressure applied by the plunger to the container is adjustable according to a position of the plunger and also according to a consistency of the product in the container.

9. The dispensing machine of claim 1 comprising nozzle means associated with said shut-off valve and being mounted for movement with said housing.

10. The dispensing machine of claim 1 wherein said deformable container opening is an open opposite end, and said housing includes sealing means engageable with said open end, the sealing means defining an outlet opening communicating with the shut-off valve means.

11. The dispensing machine of claim 10 comprising releasable securing means arranged to secure said sealing means releasably to the open end of the container.

12. The machine of to claim 11 wherein the releasable securing means is in the form of a band located around the open end of the container and engageable against a sealing plate.

13. The machine of claim 10 wherein the sealing means carries a removable gasket means which is interposed between the sealing means and the product to prevent contact between the product and the sealing means.

14. The dispensing machine of claim 1 comprising drive means operable to cause said plunger to engage and deform said container, the drive means comprising a piston and cylinder device mounted on said frame.

15. The machine of claim 14 wherein the drive means is located above the axis of the container and with its axis of movement parallel to said container axis, the plunger being connected to the drive means by a linkage.

16. The dispensing machine of claim 1 comprising at least two of said deformable containers each having an associated said plunger, and a common discharge nozzle communicating with the containers whereby product from each container may be discharged through a nozzle.

17. The dispensing machine of claim 1 comprising a housing part defining an upper enclosure member for said container when in its operative position, the upper enclosure member being fixed in relation to said housing.

18. The machine of claim 17 wherein a nozzle is formed by nozzle means communicating with said container and an additional container, said nozzle means having valve means wherein product from either container or both containers is dischargeable through said nozzle.

19. The dispensing machine of claim 1 wherein said one end of said container is formed with a recess in which the plunger is arranged to be received.

20. The dispensing machine of claim 1 wherein said opposite end defines said opening which has substantially the same cross-sectional shape as a side wall of the container.

21. The container of claim 20 wherein said one end is formed with a depression in which a head of the plunger is arranged to be received.

22. The dispensing machine of claim 1 wherein said opposite end of the container is formed with an outer surface of generally cylindrical shape and further comprises securing means engageable with said outer surface to seal said opposite end against a sealing means located within said opposite end.

* * * * *